N. C. BASSETT.
VALVE.
APPLICATION FILED JULY 25, 1907.
915,263.
Patented Mar. 16, 1909.
9 SHEETS—SHEET 2.
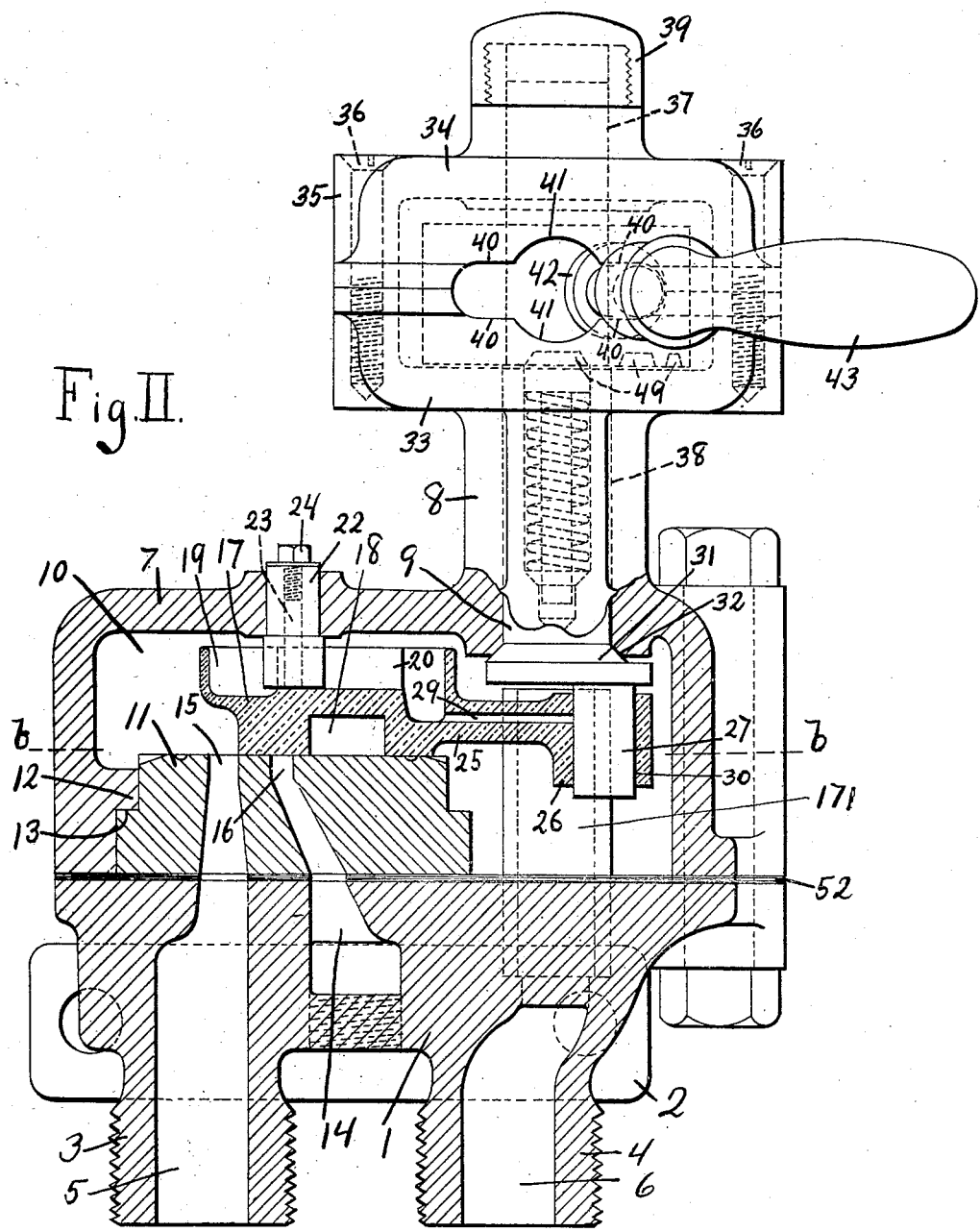
Fig. II.
WITNESSES:
John C. Rennie
Frank E. Dennett
INVENTOR
N. C. Bassett
BY
ATTORNEY.

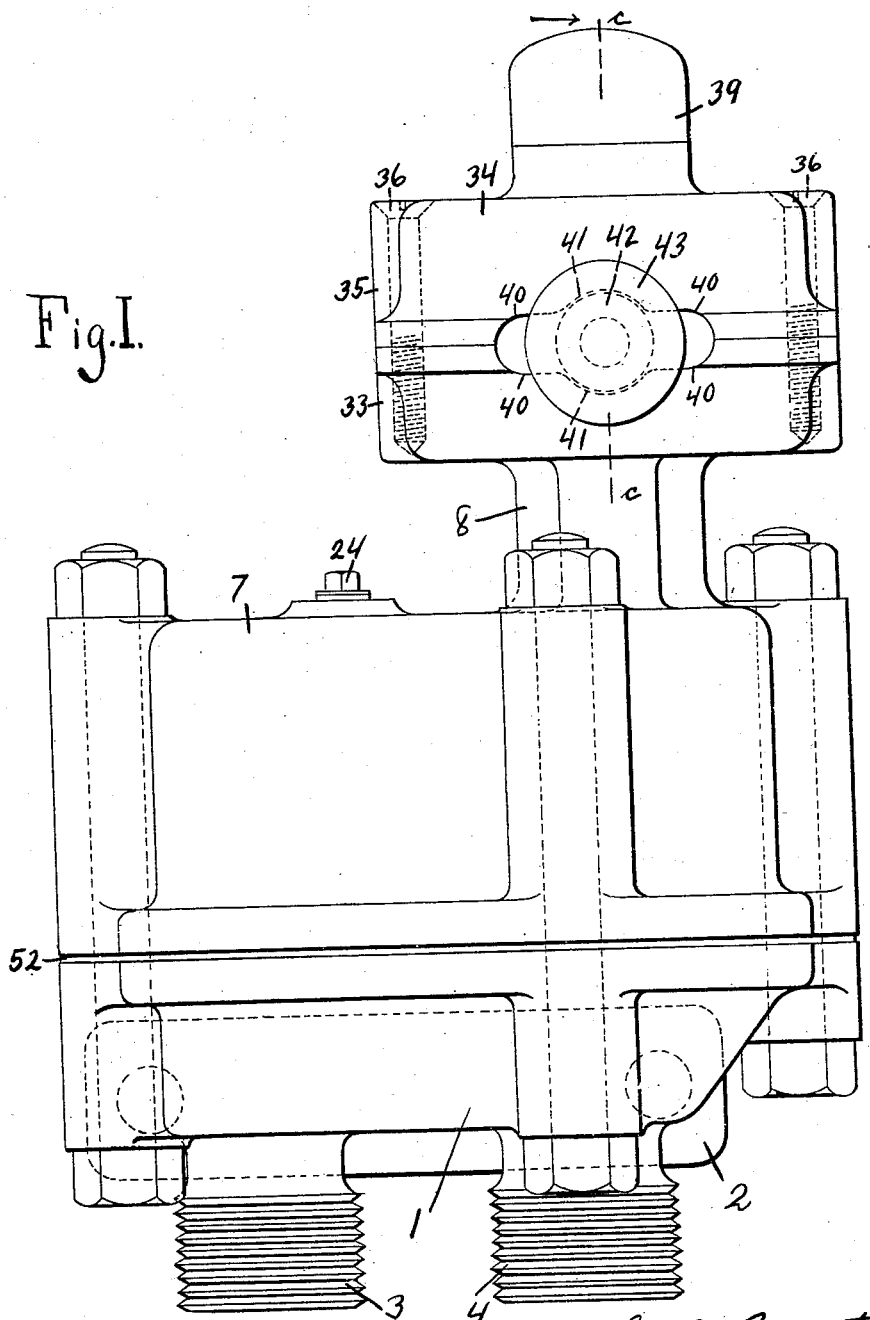

N. C. BASSETT.
VALVE.
APPLICATION FILED JULY 25, 1907.
915,263.
Patented Mar. 16, 1909.
9 SHEETS—SHEET 3.
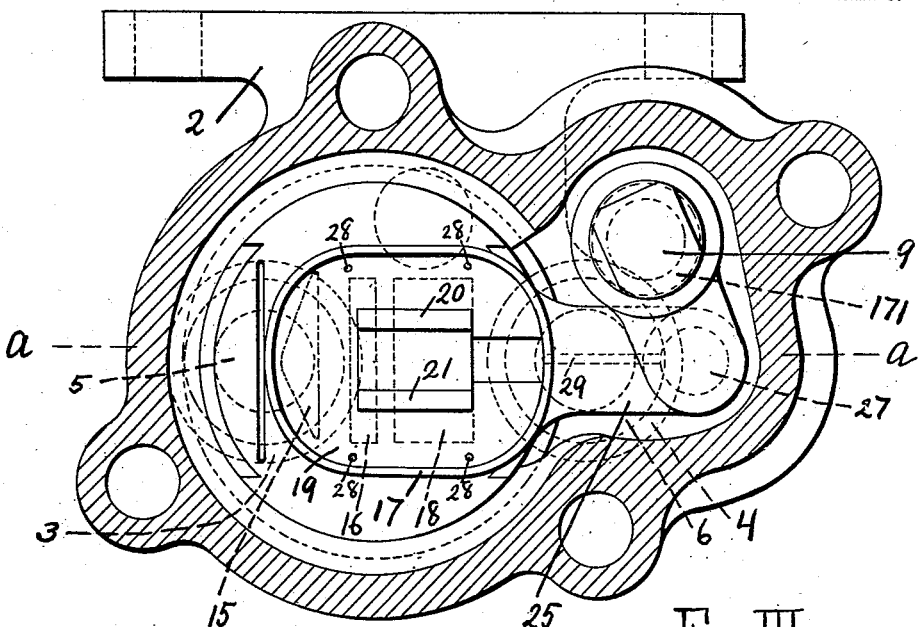
Fig. III.
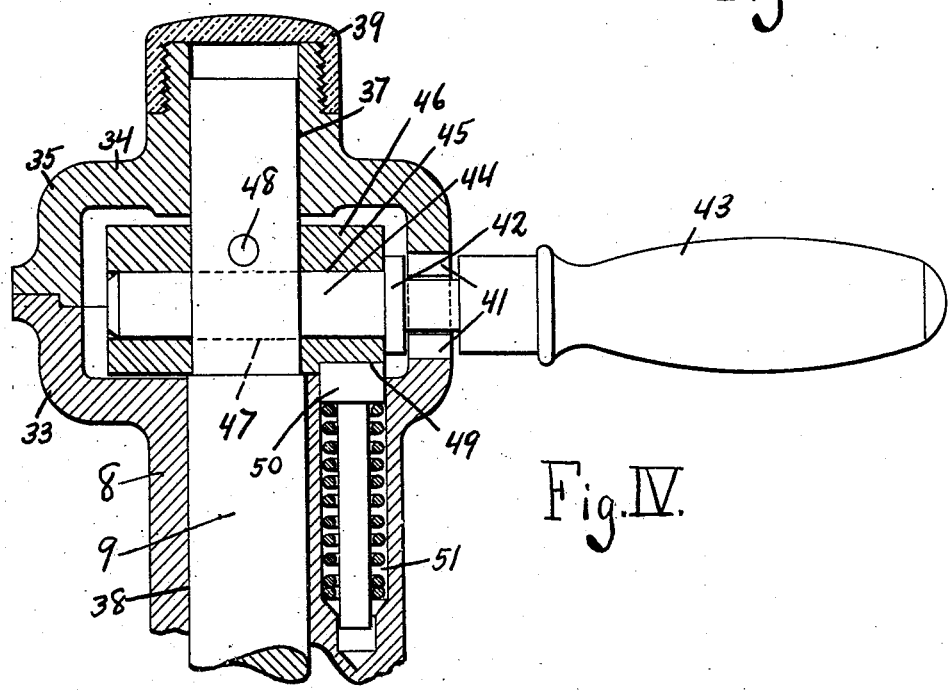
Fig. IV.
WITNESSES:
John C. Rennie
Frank E. Dennett
N. C. Bassett INVENTOR
BY
G. J. DeWein ATTORNEY.

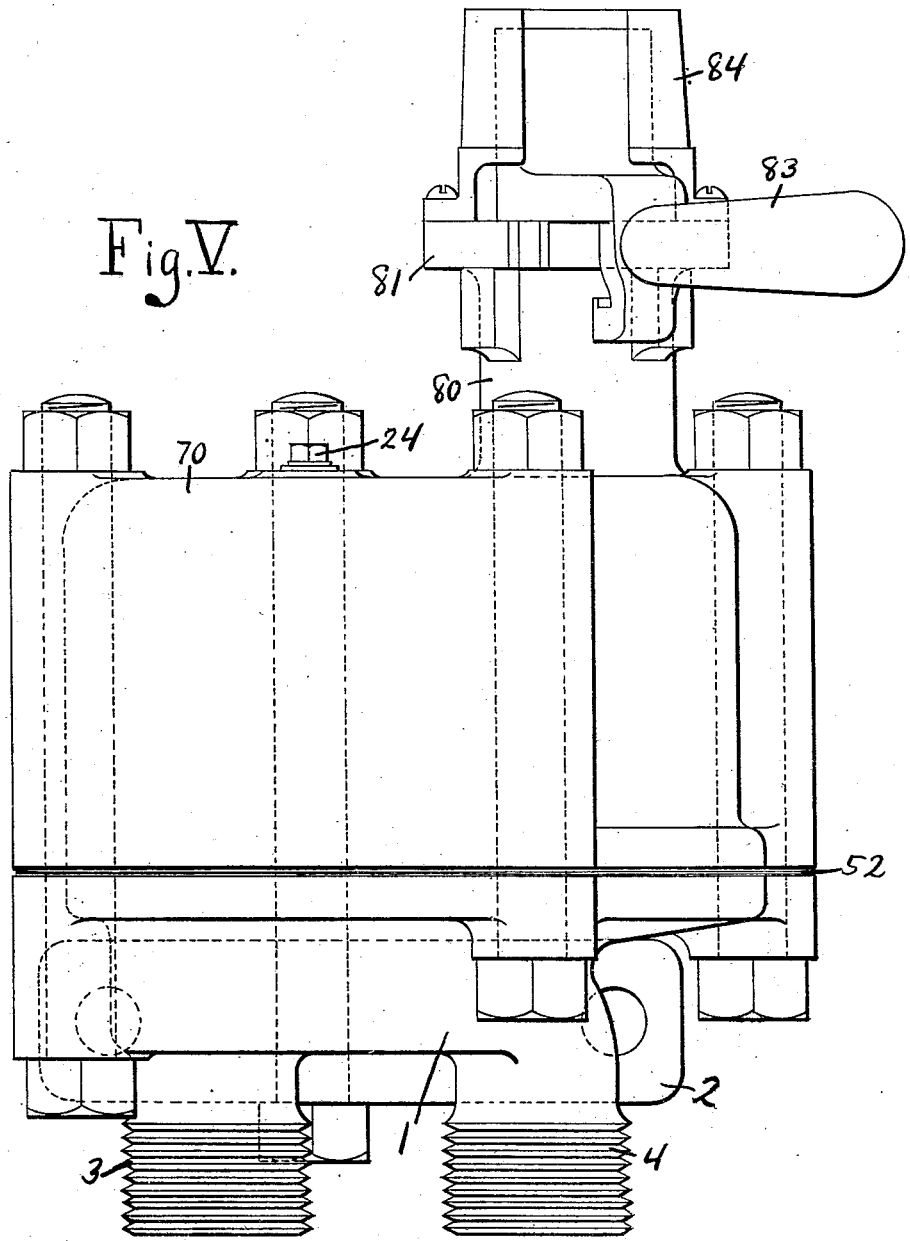

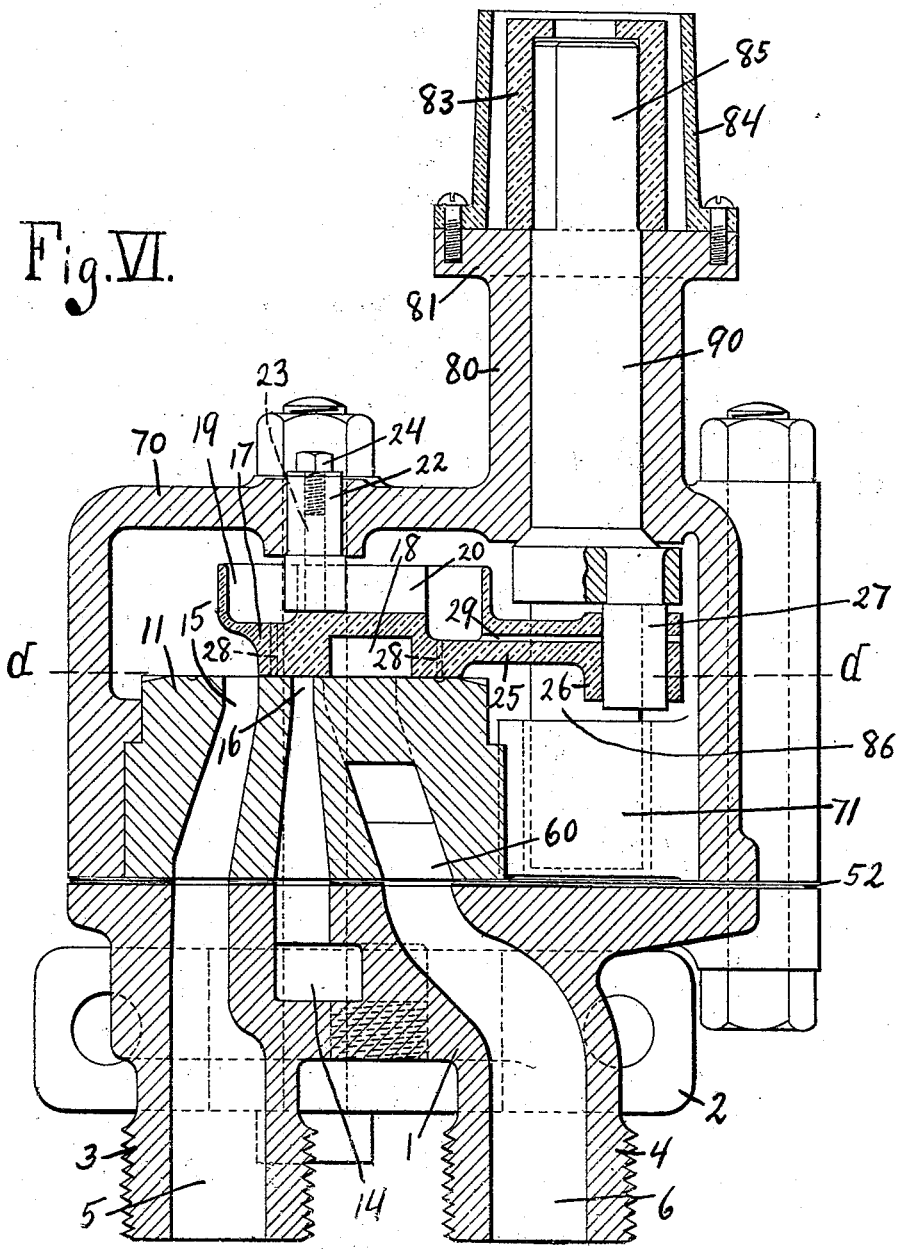

N. C. BASSETT.
VALVE.
APPLICATION FILED JULY 25, 1907.
915,263.
Patented Mar. 16, 1909.
9 SHEETS—SHEET 6.
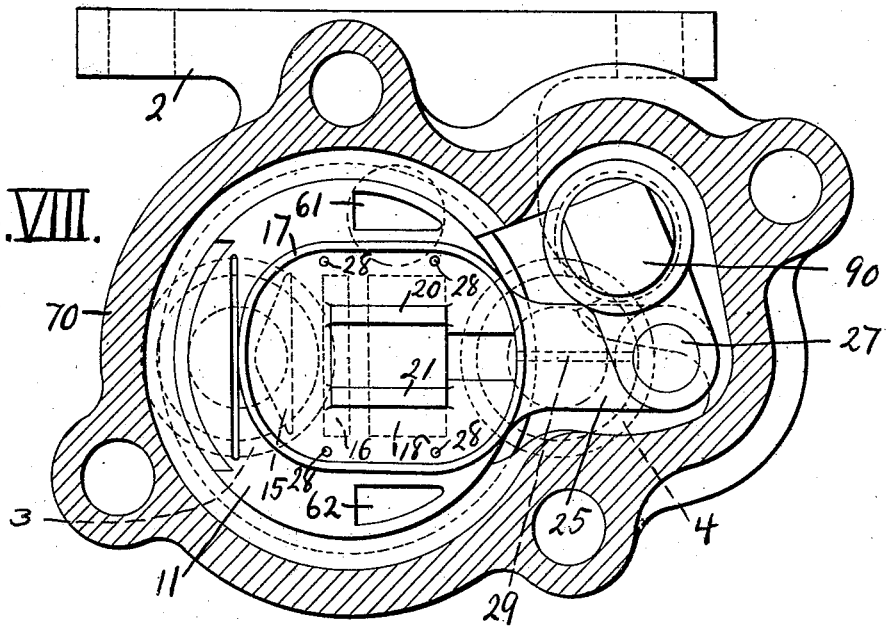
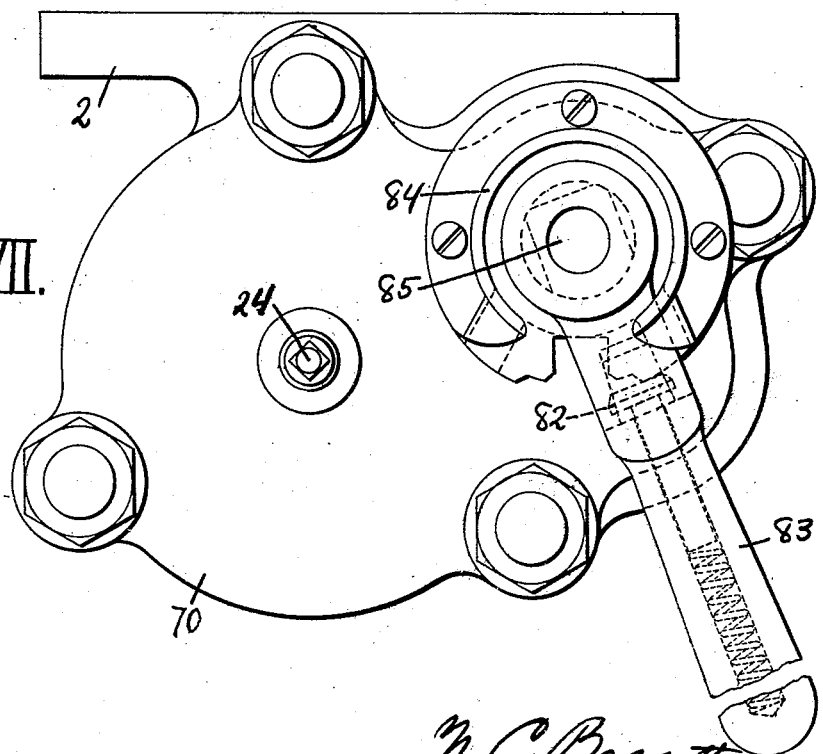
WITNESSES:
John C. Rennie
Frank E. Dennett
N. C. Bassett INVENTOR
BY
G. J. Dyken ATTORNEY.

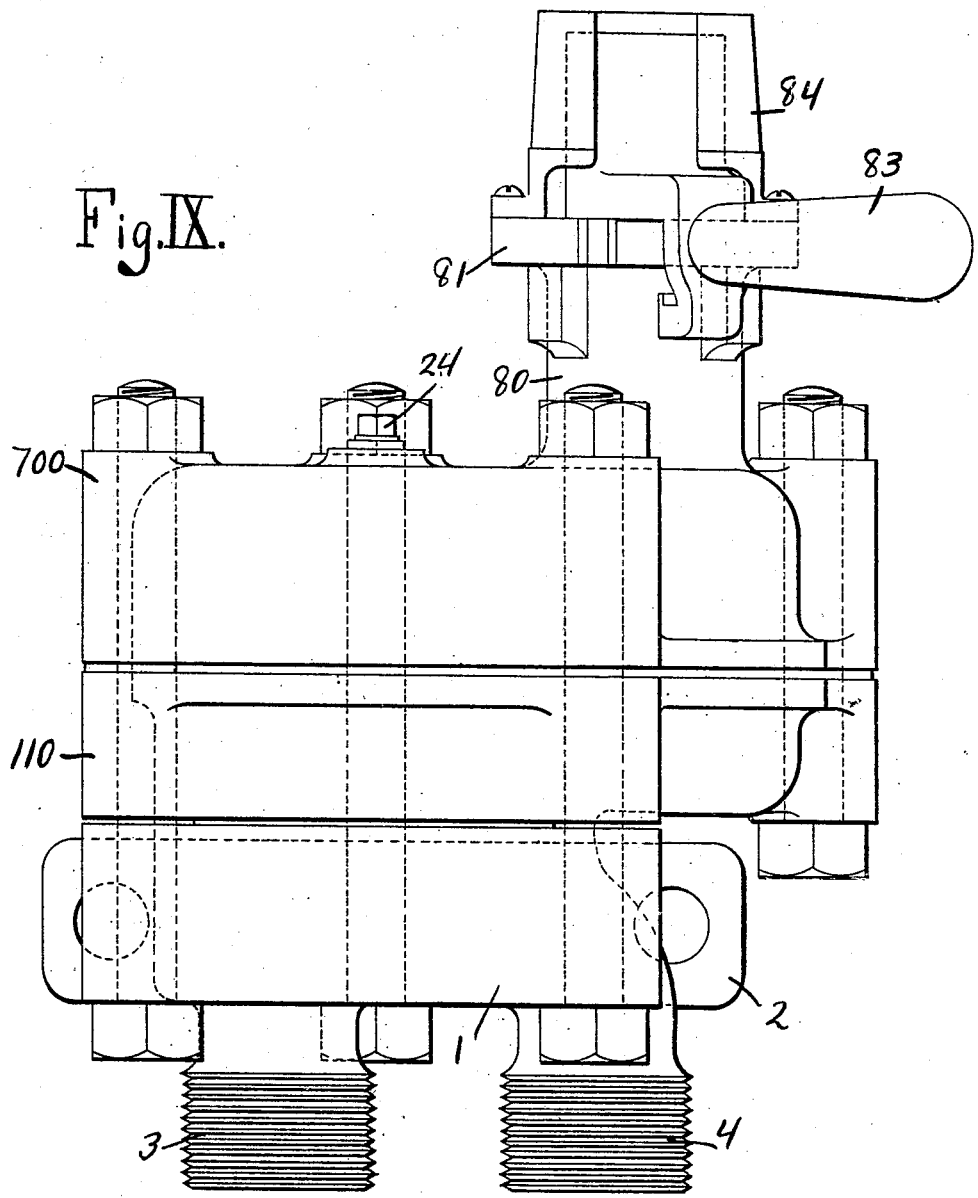

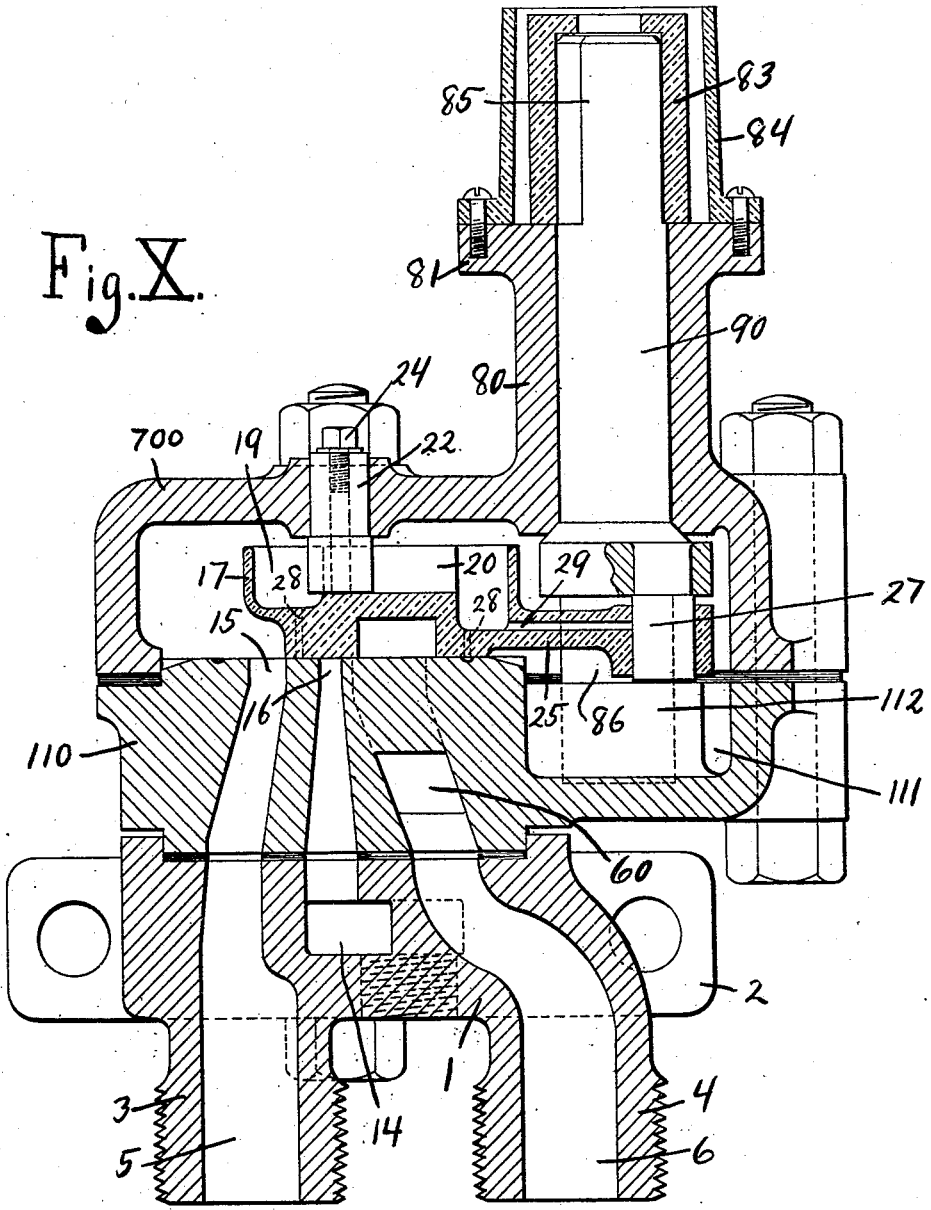

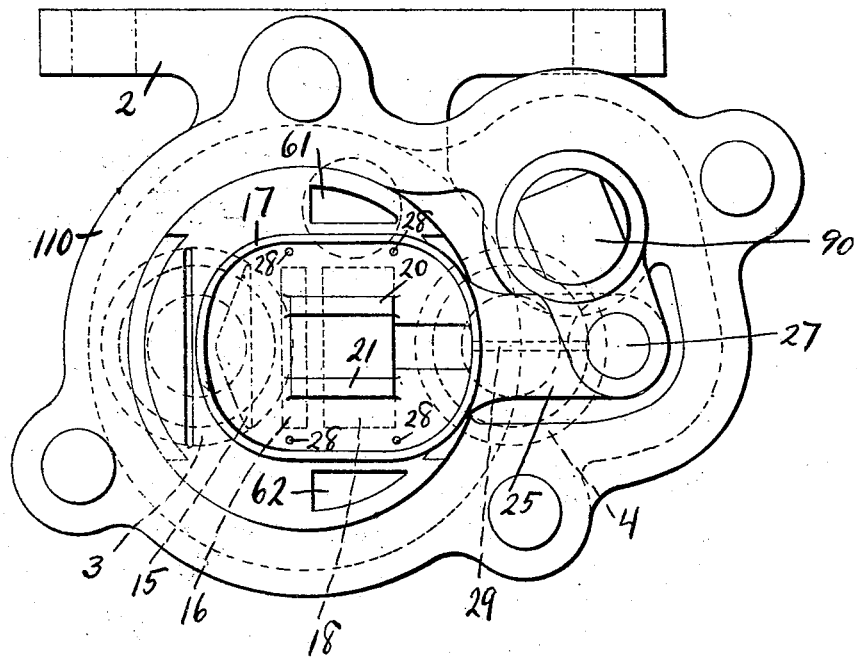
Fig. XI.

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

VALVE.

No. 915,263.

Specification of Letters Patent. Patented March 16, 1909.

Application filed July 25, 1907. Serial No. 385,467.

*To all whom it may concern:*

Be it known that I, NORMAN C. BASSETT, a citizen of the United States, residing at Milwaukee, in the county of Milwaukee and State of Wisconsin, have invented a certain new and useful Valve, of which the following is a specification.

This invention relates to valves for controlling the flow of fluid, and, while capable of general application, is specifically intended to improve valves which are used to control the flow of a fluid to or the exhaust of a fluid from some type of fluid-actuated motor, and the valve which forms the subject matter of this specification is specially well adapted for use as an engineer's valve to control the flow of compressed air to or its exhaust from the brake cylinders of vehicles.

Referring to the drawings which accompany this specification and form a part thereof and on which the same reference characters are used to designate the same elements wherever they may appear in each of the several views,—Figure 1 illustrates, in elevation, a form of valve disclosing this invention; Fig. 2 illustrates, in vertical section, the valve shown by Fig. 1, the view being taken on line a—a of Fig. 3. Fig. 3 illustrates a horizontal section taken on the line b—b of Fig. 2; Fig. 4 illustrates a vertical section of a fragment taken on the line c—c of Fig. 1, the view being taken looking with the arrow; Fig. 5 illustrates an elevation of a modified form of valve; Fig. 6 illustrates a vertical section of the modified form of valve shown by Fig. 5; Fig. 7 illustrates a plan view of the modified form of valve shown by Fig. 6; Fig. 8 illustrates a horizontal sectional view of the valve shown by Fig. 6 taken on the line d—d; Fig. 9 illustrates an elevation of a second modified form of valve; Fig. 10 illustrates a vertical section of the valve shown by Fig. 9; and Fig. 11 illustrates a plan view of certain parts of the valve shown by Fig. 9.

The purpose of this invention is to generally improve upon valves of a type which are at present in quite extensive use for controlling the flow of compressed air to and from the brake cylinders of electric cars and similar vehicles.

All of the valves at present in use for the purpose mentioned are open to criticism because of defects in their design.

The purpose of this invention is to provide a simple type of durable and efficient valve for the purpose described, the parts of which can be readily manufactured at small cost and with the parts so combined and arranged in the assembled structure that while there shall exist the greatest freedom of movement, the wear of the parts shall be reduced to a minimum.

Generally speaking, the invention comprises an arrangement of a slide valve adapted to control ports through its seat, a handle for sliding the valve upon its seat, the connection between the handle and the valve being so disposed that the force exerted on the valve is in line with the valve body and close to the seat so that there is no tendency to tip or twist the valve, this arrangement by confining the wear to the whole of the sliding surface of the valve being conducive to long life of the valve.

An additional structural feature consists in so arranging the parts that they are extended into an oil bath by which the several parts are efficiently and effectively lubricated.

Another object of the invention consists in so arranging the valve seat and the coöperating parts of the casing that there shall be only one main joint to seal and keep tight.

Another object of the invention is to provide a simple and efficient form of operating handle and to arrange the valve spindle with two main bearings by reason of which the tendency of the spindle to tip and wear unevenly, or to wear the adjacent parts of the casing unevenly, are avoided.

Other specific features will be enumerated in the specification and pointed out in the claims appended thereto.

Referring to Figs. 1, 2, 3 and 4 of the drawings, the numeral 1 designates a base block provided with an apertured lug 2, by which it is adapted to be secured to some convenient support. This base block 1 is provided with extensions 3 and 4 which are adapted to be connected with the pipes leading respectively to the brake cylinder and compressor (not shown). The extensions 3 and 4, as well as the base 1, are provided with the thoroughfares 5 and 6 extending therethrough. Seated upon the base 1 and secured thereto by bolts, as shown, or in any other convenient manner, is the cap 7 which is provided with an extension 8, preferably formed integral therewith, through an aperture in which extension the valve spindle 9 is adapted to extend into the chamber 10 formed in the interior of the cap 7. Seated upon the base 1 within the chamber 10 is the removable valve seat 11 which is retained against the base 1 by an offset portion 12 of the cap 7 resting against a shoulder 13 formed upon the valve seat. The base 1 is provided with an exhaust port 14 therethrough, and the valve seat 11 is formed with the brake port 15 and the exhaust port 16, which register respectively with the thoroughfares 5 and 14 through the base. The thoroughfare 6 is preferably extended by a pipe 17¹ up into the chamber 10, said pipe being preferably arranged in line with, and its upper open end located directly beneath the valve spindle 9, its upper open end being located slightly above the upper surface of the valve seat 11.

The numeral 17 designates a slidable valve provided with the passageway 18 on the lower surface thereof, said passageway being adapted to place the ports 15 and 16 in communication, the structure of this valve with respect to this feature being essentially that of an ordinary type of D-valve. The upper part of the valve 17 is provided with a recess 19 and with guides 20 and 21, between which guides is seated a pin or spindle 22 to retain the valve in proper alinement. This spindle is preferably formed as a plain stud, although its lower end which engages with the guides 20 and 21 may be provided with an antifrictional wheel. This pin is preferably provided with a bore 23, which may be closed by a cap 24. The valve 17 is provided with an extension 25, which has a downwardly extending boss 26, which is bored to receive the crank pin 27 on the stem 9. One or more small apertures 28, are provided, offering communication between the recess in the top of the valve and the outer and under side thereof; and a recess 29 is also provided affording communication between the aforesaid recess and the bore 30 in the boss 26. The extension 25 is so arranged with respect to the valve and the part thereof which slides on the valve seat 11, that the pull and push of the crank pin 27 is transmitted to the valve substantially in the plane of its seat, whereby no tendency exists to tip the valve with respect to its seat.

By removing the cap 24, oil may be introduced through the bore 23 into the recess 19, and from said recess it will gradually ooze through the small holes 28 on to the valve seat 11, and through the recess 29 into the bore 30, the lower part of the chamber 10 becoming filled with oil nearly to the top of the valve seat 11, and the lower part of the boss 26, and the crank arm 27 will be located in oil, whereby these parts will be effectively lubricated.

The spindle 9 is provided with a projection 31 which is fitted accurately to its seat 32 in the cap 7, in order to prevent leakage of air. The extension 8 of the cap 7 is provided with the enlarged boss 33 at its upper end, and the cap 34 is provided with a similar boss 35, and this cap is adapted to be secured to the boss 33 by any suitable fastening means, as, for example, the bolts 36, shown by the drawings. The cap 34 is provided with a bore 37 in line axially with the bore 38 of extension 8 to receive the valve stem 9, and, for the purpose of lubrication, the cap 34 is preferably provided with a removable screw cap 39. The two bosses 33 and 35 are provided with recesses 40 and 41, the central one, 41, being larger than those adjacent thereto, so that a collar or washer 42 on the handle 43 may be slipped through said aperture 41 when the valve is in lap position, while said collar will prevent the removal of the handle when the valve occupies any other position. The handle is provided with a cylindrical extension 44, which is adapted to extend through an aperture 45 in a collar 46, and through an aperture 47 in the spindle 9, the collar 46 being secured to the spindle 9 in any convenient manner, as, for example, by the pin 48. The lower part of the collar 46 is provided with notches 49 with which a spring-actuated latch 50, seated in a recess 51, in the extension 8, is adapted to coact to hold the valve in predetermined positions.

The advantages offered by the specific valve structure described are as follows: By placing the valve seat 11 within the chamber 10, only one joint, viz., that at 52 between the cap 7 and the body 1 of the valve, has to be packed, while all the advantages of a separate valve seat which is removable for the purpose of refacing or replacing, are retained. By providing moving means for the valve in such a position that the push and pull is substantially in the plane of the seat of the valve, there is no tendency to wear off the corners of the valve, to wear the seat unevenly, or to cockle or to twist the valve, and no pressure is exerted against the pin 22. The chamber 10 is adapted to receive and retain a body of oil, as well as the recess 19 in the top of the valve, so that the parts are most efficiently lubricated. By providing the cap 34 for the extension 8 with a bore for receiving the valve stem 9, two bearings are provided for said stem by which substantial support is afforded and the stem does not wear its bearings as easily as is the case where there is only one bearing; it being a notorious fact that motormen are accustomed to bear down upon the handle of a brake, tending to twist the valve spindle against opposite sides of its bearing, which with the ordinary construction of these parts results in rapid wear.

The modification illustrated by Figs. 5 to 8 inclusive, of the drawings, presents the same general features of construction as the preferred form of valve described and illustrated by Figs. 1 to 4, inclusive, of the drawings; and the same reference characters are placed upon said figures to indicate the same parts. In this modification, the pipe 171 of the preferred form is dispensed with, the thoroughfare 6 being in communication with a passageway 60 through the valve seat 11, said passageway being branched and opening through the top of said valve seat at either side of the valve through the ports 61 and 62. The extension 80 of the cap 70 is not provided with a boss but with a notched flange 81 with which the latch 82 of an ordinary form of operating handle 83 is adapted to coact, a guard 84 being provided surrounding the squared extension 85 of the valve stem. The cap 70 is provided with an inwardly extended boss 71, which terminates short of the bottom of said cap and is provided with a bore extending therethrough, within which bore is received an extension 86 of the valve stem 90.

The modification illustrated by Figs. 9 to 11, inclusive, of the drawings is in all substantial particulars the same as the modification disclosed by Figs. 6 to 9 of the drawings, except that the cap 700 does not surround or inclose the valve seat 110, but rests thereon, forming a three-part valve case similar to those in common use. In this specific modification, the valve seat 110 is provided with the recess 111, within which recess is located the boss 112 which is bored to receive the projection 86 of the valve stem 90.

The general structural features of each of the three types of valve shown are the same, the modifications disclosed being illustrative to clearly show how the patentable novelty disclosed by this specification may be readily utilized in a specific type of valve.

What I claim is,—

1. The combination with a base, of a removable valve seat seated thereon, a cap inclosing said valve seat and confining it to said base, a slidable valve upon said seat, means to retain said valve in position upon said seat, and means disposed substantially in the plane of said seat for sliding said valve thereon.

2. The combination with a base provided with apertures, of a removable valve seat seated upon said base and provided with ports in alinement with said apertures, a cap for securing said seat upon said base, a slidable valve on said seat, means for retaining the valve in position upon said seat, and means disposed substantially in the plane of said seat for sliding said valve thereon.

3. The combination with a base provided with apertures, of a removable valve seat provided with ports in alinement with said apertures, a cap adapted to retain said valve seat upon said base, a slidable valve upon said seat, means for retaining said valve in position upon said seat, said valve being provided with a projection which in turn is provided with a boss, said boss being apertured, and means located within the aperture of said boss and extended into the plane of said seat for sliding said valve upon said seat.

4. The combination with a base provided with apertures adapted to be connected respectively with the air reservoir and brake cylinder in a brake system, a removable valve seat seated upon said base with a port in alinement with one of said apertures, said valve seat being also provided with an exhaust port, the other of said apertures being in communication with an open-ended pipe which extends beyond the upper surface of said valve seat, a slidable valve on said valve seat, a cap inclosing said valve, valve seat and pipe, means to retain said valve in position upon said seat, and means extended through said cap and engaged with said valve substantially in the plane of said seat to slide said valve upon said seat.

5. The combination with a base provided with apertures adapted to be connected respectively with the reservoir and brake cylinder of a brake system, of a removable valve seat upon said base provided with a port in alinement with one of said apertures, said valve seat being also provided with an exhaust port, the other of said apertures in said base being in communication with an open-ended pipe the under end of which extends above the upper surface of said valve seat, a cap inclosing said valve seat and pipe, a slidable valve on said valve seat provided with a recessed upper portion and guides, a pin extended through said cap and adapted to retain said valve in position upon said valve seat, a valve stem provided with a crank arm engaged with said valve substantially in the plane of said seat, apertures being provided through which oil may flow from the recess in the upper portion of said valve to said valve seat and to said crank arm.

6. The combination with a valve casing provided with a ported valve seat therein and a valve thereon to control said ports, of a valve stem provided with a handle extended into said casing, said valve operating stem being supported at two separate parts of its length.

7. The combination with a valve stem provided with a transverse aperture, of a collar secured thereon provided with a transverse aperture therethrough in alinement with the aperture in said stem, and a handle, said handle being provided with a projection adapted to extend into the apertures of said collar and said stem.

8. The combination with a casing provided with a ported valve seat and a valve, said casing being provided with a projection and a cap, both of which are provided with bores, a valve stem seated in said bores and connected with said valve, and a handle engaged with said stem at a point between said bores.

In testimony whereof, I affix my signature in the presence of two witnesses.

NORMAN C. BASSETT.

Witnesses:
 H. C. CASE,
 FRANK E. DENNETT.